US00RE33843E

United States Patent [19]

Naramore et al.

[11] E Patent Number: Re. 33,843

[45] Reissued Date of Patent: Mar. 10, 1992

[54] SHEET TRANSPORT AND REGISTRATION APPARATUS

[75] Inventors: Raymond A. Naramore, Penfield, Pa.; Anthony Ilacqua, Rochester, N.Y.

[73] Assignee: Xerox Corporation, Stamford, Conn.

[21] Appl. No.: 326,134

[22] Filed: Mar. 20, 1989

Related U.S. Patent Documents

Reissue of:

[64] Patent No.: 4,744,555
Issued: May 17, 1988
Appl. No.: 944,064
Filed: Dec. 22, 1986

[51] Int. Cl.[5] ..... B65H 9/16

[52] U.S. Cl. ..... 271/251; 271/161; 271/188; 271/209; 271/274

[58] Field of Search ..... 271/250, 251, 161, 188, 271/209, 272-274

[56] References Cited

U.S. PATENT DOCUMENTS

| | | | |
|---|---|---|---|
| 2,995,364 | 8/1961 | Frederick et al. . | |
| 3,148,877 | 9/1964 | Brearly . | |
| 3,595,565 | 7/1971 | Bergland . | |
| 3,762,700 | 10/1973 | Peterson et al. . | |
| 3,980,295 | 9/1976 | Kleid | 271/272 X |
| 3,989,237 | 11/1976 | Goff et al. | 271/19 |
| 4,089,378 | 5/1978 | Suzuki | 271/272 X |
| 4,179,117 | 12/1979 | Rhodes | 271/251 |
| 4,193,590 | 3/1980 | Mongagnino | 271/119 |
| 4,195,832 | 4/1980 | Krumrey | 271/272 X |
| 4,214,740 | 7/1980 | Acquaviva | 271/188 X |
| 4,305,577 | 12/1981 | Clay et al. | 271/119 |
| 4,359,217 | 11/1982 | Roller | 271/188 X |
| 4,469,319 | 9/1984 | Robb | 271/188 X |
| 4,579,444 | 4/1986 | Pinckney et al. . | |
| 4,712,786 | 12/1987 | Looney | 271/251 X |

FOREIGN PATENT DOCUMENTS

| | | | |
|---|---|---|---|
| 0047181 | 10/1982 | European Pat. Off. . | |
| 0127242 | 5/1984 | European Pat. Off. . | |
| 1115184 | 10/1961 | Fed. Rep. of Germany . | |
| 2304778 | 8/1973 | Fed. Rep. of Germany | 271/188 |
| 42586 | 4/1979 | Japan | 271/188 |
| 127558 | 6/1986 | Japan | 271/250 |

OTHER PUBLICATIONS

IBM Technical Disclosure Bulletin, vol. 24, No. 7B, Dec. 1981, authors N. K. Arter et al., title: Deskewing Document Feeder.

*Primary Examiner*—Richard A. Schacher
*Attorney, Agent, or Firm*—H. Fleischer; J. E. Beck; R. Zibelli

[57] ABSTRACT

An apparatus in which a sheet is registered during the movement thereof. The sheet is moved along a path in a forward direction of movement and a lateral direction of movement substantially normal thereto. The lateral movement of the sheet causes the side edge of the sheet to engage a registration edge so as to be aligned thereat. The magnitude of the moving force applied on the sheet is proportional to the thickness of the sheet. In this way, the moving force varies as a function of the thickness of the sheet with the sheet slipping laterally when engaging the registration edge to prevent buckling thereof.

2 Claims, 2 Drawing Sheets

SHEET TRANSPORT AND REGISTRATION APPARATUS

Matter enclosed in heavy brackets [ ] appears in the original patent but forms no part of this reissue specification; matter printed in italics indicates the additions made by reissue.

This invention relates generally to an electrophotographic printing machine, and more particularly concerns an apparatus for registering a sheet during the movement thereof.

In a typical electrophotographic printing process, a photoconductive member is charged to a substantially uniform potential so as to sensitize the surface thereof. The charged portion of the photoconductive member is exposed to a light image of an original document being reproduced. Exposure of the charged photoconductive member selectively dissipates the charges thereon in the irradiated areas. This records an electrostatic latent image on the photoconductive member corresponding to the informational areas contained within the original document. After the electrostatic latent image is recorded on the photoconductive member, the latent image is developed by bringing a developer material into contact therewith. Generally, the developer material comprises toner particles adhering triboelectrically to carrier granules. The toner particles are attracted from the carrier granules to the latent image forming a toner powder image on the photoconductive member. The toner powder image is then transferred from the photoconductive member to a copy sheet. The toner particles are heated to permanently affix the powder image to the copy sheet.

In a commercial printing machine of the foregoing type, the copy sheet, with the information permanently reproduced thereon, is transported to a compiler which collects sheets to form document sets. As the sheets are transported to the compiler, the side edges thereof are registered. At the compiler, the sheets are attached to one another to form the document set. The sheets may be attached to one another by either a stapler or a binder. The document set is then ejected at a high speed from the compiler into a catch tray for subsequent removal therefrom. In a typical registration transport, a force is applied on the copy sheets to move them to a fixed registration edge as the sheets are simultaneously moved towards an exit. The driving force is normally furnished by a driver which is slightly angled toward the registration edge. This driver is usually an angled ball on a belt, pinch roll, or any other similar device. With any type of mechanism, the driving force must be designed such that when the copy sheet engages the registration edge, it can slip in the drive nip before it buckles. However, as the sheet slips, it must also continue to move forward toward the exit of the transport. In such transports, there is a delicate balance of forces whenever a wide range of sheet weights must be handled. When light weight sheets are being fed, a low drive force is required to avoid buckling the sheet when it engages the registration edge. When heavier weight sheets are used, a higher driving force is required to overcome the drag caused by sheet curl. There have been various attempts made to design a system that automatically adjusts the drive force as a function of sheet thickness. These systems may be effective, but the initial set up is critical and the system is susceptible to wear and parts tolerances.

Various approaches have been devised for registering a copy sheet during the movement thereof. The following disclosures appear to be relevant:

U.S. Pat. No. 2,995,364. Patentee: Frederick et al. Issued: Aug. 8, 1961.

U.S. Pat. No. 3,148,877. Patentee: Brearley. Issued Sept. 15, 1964.

U.S. Pat. No. 3,595,565. Patentee: Bergland. Issued: July 27, 1971.

U.S. Pat. No. 3,762,700. Patentee: Peterson et al. Issued: Oct. 2, 1973.

U.S. Pat. No. 3,989,237. Patentee: Goff, Jr. et al. Issued: Nov. 2, 1976.

U.S. Pat. No. 4,179,117. Patentee: Rhodes, Jr. Issued: Dec. 18, 1979.

U.S. Pat. No. 4,193,590. Patentee: Mongagnino. Issued: Mar. 18, 1980.

U.S. Pat. No. 4,305,577. Patentee: Clay, et al. Issued: Dec. 15, 1981.

U.S. Pat. No. 4,579,444. Patentee: Pinckney et al. Issued: Apr. 1, 1986.

The relevant portions of the foregoing patents may be summarized as follows:

Frederick et al. describes an apparatus for feeding bank checks of different thicknesses in which sets of rollers are placed tangential to the path of travel of individual checks. Each set of rollers is placed at a different angle with respect to an edge guide to sequentially feed the checks toward the guide.

Brearley discloses a sheet driving and aligning mechanism using a plurality of thin wafer-like rolls or disks spaced along a desired feed path for successive sheets. A freely rotatably idler roller is mounted below and in vertical alignment with each disk to provide a sheet gripping bite into which successive sheets are advanceable. The aligning component of force varies according to the stiffness of the material from which the disks are made. The greater the stiffness, the greater the force. If exceptionally thin and light weight sheets are being driven and aligned, the disks should be formed of a material which is quite flexible to keep the aligning component of the force at an absolute minimum and prevent edge damage to the sheets.

Bergland teaches the use of belts for advancing and urging sheets toward an edge guide. The belts engage opposite sides of the sheet. A slight corrugation of the sheets is temporarily formed in the longitudinal direction of sheet motion.

Paterson et al. describes a device for feeding and aligning documents. The documents are supported on a platform. A feed belt is positioned in a channel in the platform. Movable spheres are arranged to press against one surface of the belt. A roller having a portion thereof extending through a slot in the platform is adapted to engage one side of the document supported on the belt. The spheres engage the other side of the document pressing it against the belt. When the spheres engage the document, the document moves with the belt. When the spheres are no longer pressed against the document, the document is driven by the roller against an edge guide.

Goff, Jr. et al. discloses a method for separating a top sheet from a stack of sheets by causing the top sheet to buckle slightly due to a laterally applied force. Thereafter, a lateral force is applied in the opposite direction to remove the sheet.

Rhodes, Jr. describes a set of drive and alignment rollers for use in a copier. The drive roller is skewed relative to the path of travel with the alignment roller being skewed in an opposite direction. In this way, the copy sheets are moved towards a reference edge.

Mongagnino discloses an adjustable feed deck having a multiple position setting to provide inter batch changes between a separator and a roller to feed sheets of varying thickness.

Clay, et al. describes a shingle or wheel-type document feeder which has an arm to apply a force normal to the shingle or wheel to thereby stack the documents.

Pinckney et al. discloses a document side edge registration and deskewing system including a deskewing drive roller and its mating deskewing idler roller. Take away rolls are aligned to the document path so as to feed the document sheet through arcuate document guides or baffles. After the lead edge of the document has entered the nip between the deskewing rollers, a solenoid separates the take away rolls releasing the document so that the deskewing rollers can advance the document against a registration edge.

In accordance with one aspect of the present invention, there is provided an apparatus for registering a sheet during the movement thereof. The apparatus includes a registration edge. Means move the sheet along a predetermined path having a forward direction of movement and a lateral direction of movement substantially normal to the forward direction of movement. The lateral movement of the sheet causes the side edge of the sheet to engage the registration edge so as to be aligned thereat. The moving means applied a moving force having a magnitude proportional to the thickness of the sheet so that the moving force varies as a function of the thickness of the sheet being moved with the sheet slipping laterally when engaging the registration edge to prevent buckling thereof.

Pursuant to another aspect of the features of the present invention, there is provided an electrophotographic printing machine of the type having a document handling apparatus for advancing individual document sheets from a stack to an exposure station and returning to the stack in repeated cycles. A processor forms copies of the documents. Each copy sheet is advanced to a copy sheet attaching station and registered during the movement thereof. The improvement in the printing machine includes a registration edge, and means for moving the copy sheet along a predetermined path having a forward direction and a lateral direction of movement substantially normal to the forward direction of movement. The lateral movement of the copy sheet causes the side edge of the copy sheet to engage the registration edge so as to aligned thereat. The moving means applies a moving force having a magnitude proportional to the thickness of the copy sheet so that the moving force varies as a function of the thickness sheet being moved with the copy sheet slipping laterally when engaging the registration edge to prevent buckling thereof.

Other aspects of the present invention will become apparent as the following description proceeds and upon reference to the drawings in which.

While the present invention will hereinafter be described in connection with a preferred embodiment thereof, it will be understood that it is not intended to limit the invention to that embodiment. On the contrary, it is intended to cover all alternatives, modifications, and equivalents, as may be included within the spirit and scope of the invention as defined by the appended claims.

Figure 1:
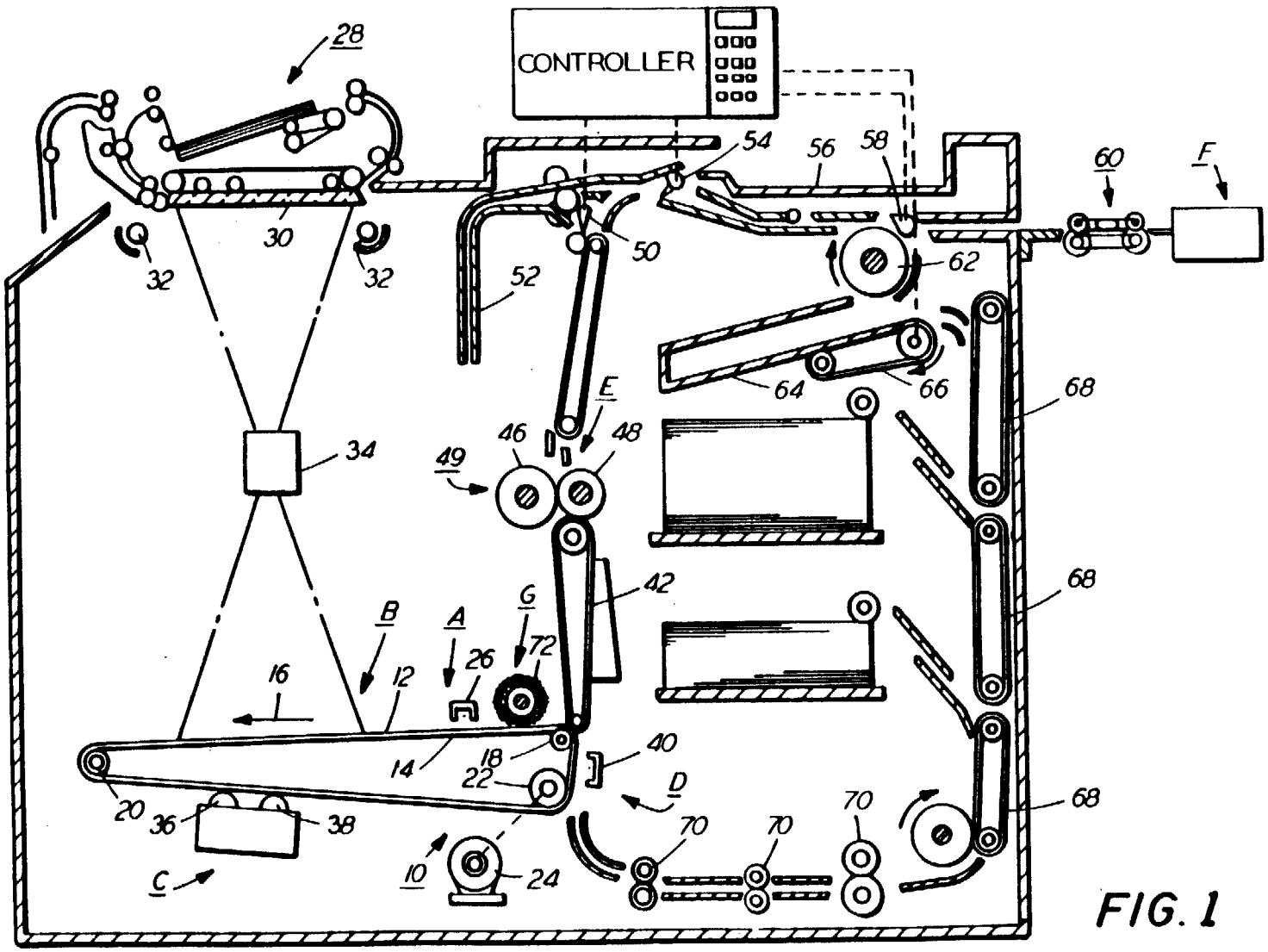
FIG. 1 is a schematic elevational view depicting an illustrative electrophotographic printing machine incorporating the sheet transport and registration apparatus of the present invention therein.

For a general understanding of the features of the present invention, reference is made to the drawings. In the drawings, like reference numerals have been used to identify identical elements. FIG. 1 schematically depicts an electrophotographic printing machine incorporating the features of the present invention therein. It will become evident from the following discussion that the sheet transport and registration apparatus of the present invention may be employed in a wide variety of devices and is not specifically limited in its application to the particular embodiment depicted herein.

Referring to FIG. 1 of the drawings, the electrophotographic printing machine employs a belt 10 having a photoconductive surface 12 deposited on a conductive substrate 14. Preferably, photoconductive surface 12 is made from a selenium alloy with conductive substrate 14 being made from an aluminum alloy. Other suitable photoconductive materials and conductive substrates may also be employed. Belt 10 moves in the direction of arrow 16 to advance successive portions of photoconductive surface 12 sequentially through the various processing stations disposed about the path of movement thereof. Belt 10 is entrained about stripping roller 18, tensioning roller 20, and drive roller 22. Stripping roller 18 is mounted rotatably so as to rotate with belt 10. Tensioning roller 20 is resiliently urged against belt 10 to maintain belt 10 under the desired tension. Drive roller 22 is rotated by motor 24 coupled thereto by suitable means such as a belt drive. As roller 22 rotates, it advances belt 10 in the direction of arrow 16.

Initially, a portion of photoconductive surface 12 passes through changing station A. At charging station A, a corona generating device, indicated generally by the reference 26 charges photoconductive surface 12 to a relatively high, substantially uniform potential.

Next, the charged portion of photoconductive surface 12 is advanced through imaging station B. At imaging station B, a document handling unit, indicated generally by the reference numeral 28, is positioned over platen 30 of the printing machine. Document handling unit 28 sequentially feeds documents from a stack of documents placed by the operator face up in a normal forward collated order in the document stacking and holding tray. A document feeder located below the tray forwards the bottom document in the stack to a pair of take-away rollers. The bottom sheet is then fed by the rollers through a document guide to a feed roll pair and belt. The belt advances the document to platen 30. After imaging, the original document is fed from platen 30 by the belt into a guide and feed roll pair. The document then advances into an inverter mechanism and back to the document stack through the feed roll pair. A position gate is provided to divert the document to the inverter or to the feed roll pair. Imaging of a document is achieved by lamps 32 which illuminate the document on platen 30. Light rays reflected from the document are transmitted through lens 34. Lens 34 focuses light images of the original document onto the charged portion of photoconductive surface 12 of belt 10 to selectively dissipate the charge thereon. This records an electrostatic latent image on photoconductive surface 12 which corresponds to the informational area contained within the original document. Thereafter, belt 10 advances the electrostatic latent image recorded on photoconductive surface 12 to development station C.

At development station C, a pair of magnetic brush developer rolls indicated generally by the reference numerals 36 and 38, advance developer material into contact with the electrostatic latent image. The latent image attracts toner particles from the carrier granules of the developer material to form a toner powder image on photoconductive surface 12 of belt 10. Belt 10 then advances the toner image to transfer station D.

At transfer station D, a copy sheet is moved into contact with the toner powder image. Transfer station D includes a corona generating device 40 which sprays ions onto the backside of the copy sheet. This attracts the toner powder image from photoconductive surface 12. After transfer, conveyor 42 advances the copy sheet to fusing station E.

Fusing station E includes a fuser assembly, indicated generally by the reference numeral 44 which permanently affixes the transferred toner powder image to the copy sheet. Preferably, fuser assembly 44 includes a heated fuser roller 46 and a back-up roller 48 with the powder image on the copy sheet contacting fuser roller 46. In this manner, the powder image is permanently affixed to the copy sheet.

After fusing, the copy sheets are fed to gate 50 which functions, as an inverter selector. Depending upon the position of gate 50, the copy sheets are deflected to sheet inverter 52 or bypass inverter 52 and are fed directly to a second decision gate 54. At gate 54, the sheet is in a face-up orientation with the image side, which has been fused, face up. If inverter path 52 is selected, the opposite is true, i.e. the last printed side is face down. Decision gate 54 either deflects the sheet directly into an output tray 56 or deflects the sheet to decision gate 58. Decision gate 58 may divert successive copy sheets to duplex inverter roll 62, or onto a transport path having the sheet transport and registration apparatus of the present invention, indicated generally by the reference numeral 60. Sheet transport and registration apparatus 60 registers and transports successive copy sheets to finishing station F. At finishing station F, copy sheets are stacked in a compiler tray and attached to one another to form sets. The sheets are attached to one another by either a binding device or a stapling device. In either case, a plurality of sets of documents are formed in finishing station F. When decision gate 58 diverts the sheet onto inverter roll 62, roll 62 inverts and stacks the sheets to be duplexed in duplex tray 64. Duplex tray 64 provides an intermediate or buffer storage for those sheets that have printed on one side and on which an image will be subsequently printed on the second, opposed side thereof, i.e. the sheets being duplexed. The sheets are stacked in duplex tray face down on top of one another in the order in which they are copied.

In order to complete duplex copying, the simplex sheets in tray 64 are fed, in seriatim, by bottom feeder 66 from tray 64 back to transfer station D via conveyors 68 and rollers 70 for transfer of the toner powder image to the opposed sides of the copy sheets. Inasmuch as successive bottom sheets are fed from duplex tray 64, the proper or clean side of the copy sheet is positioned in contact with belt 10 at transfer station D so that the toner powder image is transferred thereto. The duplex sheet is then fed through the same path as the simplex sheet to be stacked in tray 56 or, when the finishing operation is selected, to be advanced by sheet transporting and registering apparatus 60 to finishing station F.

Invariably, after the copy sheet is separated from photoconductive surface 12 of belt 10, some residual particles remain adhering thereto. These residual particles are removed from photoconductive surface 12 at cleaning station G. Cleaning station G includes a rotatably mounted fibrous or electrostatic brush 72 in contact with photoconductive surface 12 of belt 10. The particles are cleaned from photoconductive surface 12 of belt 10 by the rotation of brush 72 in contact therewith. Subsequent to cleaning a discharge lamp (not shown) floods photoconductive surface 12 to dissipate any residual electrostatic charge remaining thereon prior to the charging thereof for the next successive imaging cycle.

The various machine functions are regulated by a controller 74. Controller 74 is preferably a programmable microprocessor which controls all of the machine functions hereinbefore described. The controller provides a comparison count of the copy sheets, the number of documents being recirculated, the number of copy sheets selected by the operator, time delays, jam corrections, etc. The control of all of the exemplary systems heretofore described may be accomplished by conventional control switch inputs from the printing machine consoles selected by the operator. Conventional sheet path sensors or switches may be utilized to keep track of the position of the documents and the copy sheets. In addition, controller 74 regulates the various positions of the decision gates depending upon the mode of operation selected. Thus, when the operator selects the finishing mode, either an adhesive binding apparatus and/or a stapling apparatus will be be energized and the decision gates will be oriented so as to advance either the simplex or duplex copy sheets to sheet transporting and registering apparatus 60, which, in turn transports the copy sheet to the compiler tray at finishing station F. The detailed operation of sheet transporting and registering apparatus 60 will be described hereinafter with reference to FIGS. 2 through 4, inclusive.

Figure 2:
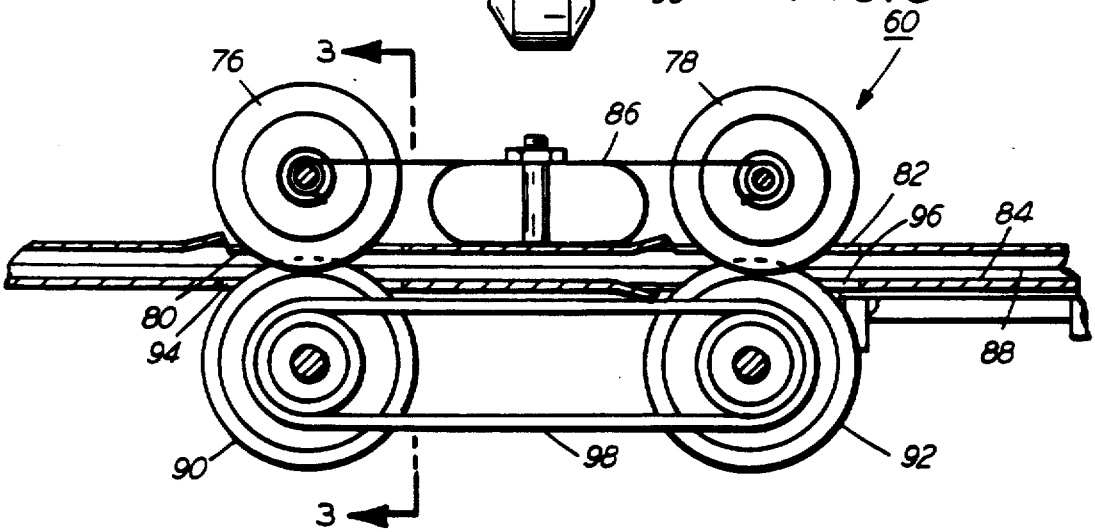
FIG. 2 is a schematic elevational view showing the FIG. 1 sheet transport and registration apparatus.

Referring now to FIG. 2, the features of sheet transporting and registering apparatus 60 will be described in greater detail. As shown thereat, sheet transporting and registering apparatus 60 includes idler roller pairs 76 and 78. Each idler pair comprises two idler rollers mounted on a common shaft and spaced from one another to define a gap therebetween. The idler roller pairs are positioned in slots 80 and 82, respectively, in tray 84. Idler roller pairs 76 and 78 are spaced from one another and connected to one another by a spring 86. Spring 86 resiliently urges idler roller pairs 76 and 78 in a downwardly direction. Idler roller pairs 76 and 78 are skewed so that the longitudinal axis of their respective drive shafts is at a transverse angle with respect to registration edge 88 mounted on the side of tray 84 and extending in a plane substantially normal to the plane defined by tray 84. Drive rollers 90 and 92 are positioned on the opposed side of tray 84 and are adapted to pass through slots 94 and 96 therein so as to be located in the gap between their respective idler rollers. Thus, drive roller 92 is located in the gap between the spaced idler rollers of idler roller pair 78 and drive roller 90 is located in the gap between adjacent spaced rollers of idler roller pair 76. The foregoing is shown more clearly in FIG. 3. Drive rollers 90 and 92 are spaced from one another and connected to one another by a timing belt 98. A motor (not shown) rotates the timing belt which, in turn, rotates both drive rollers.

Figure 3:
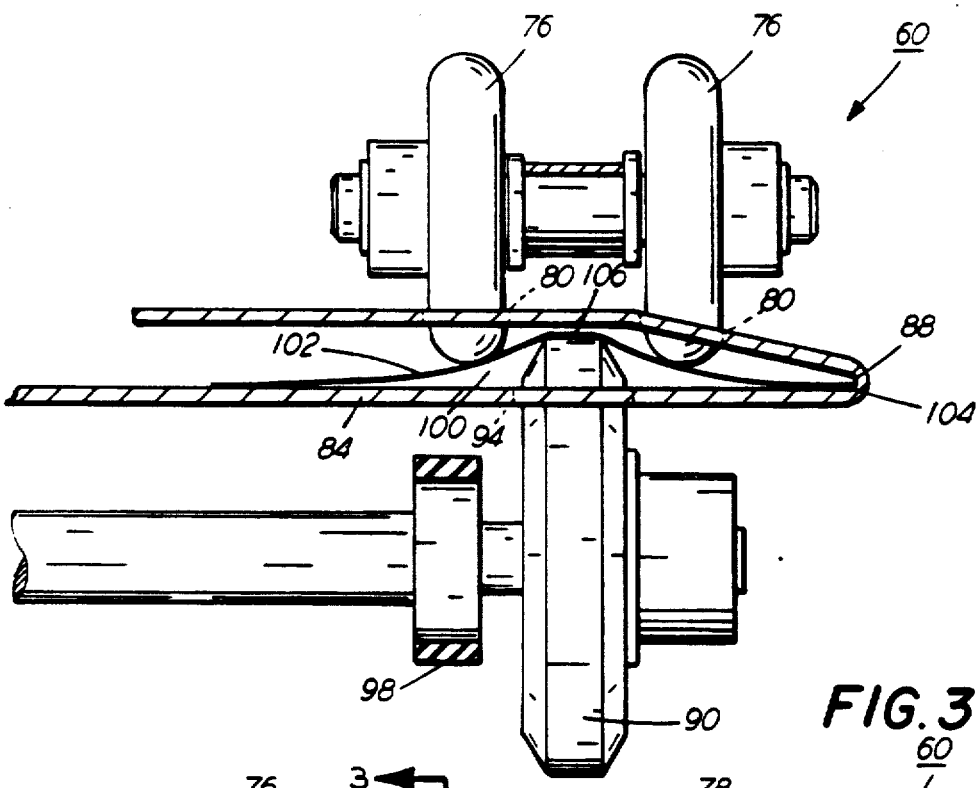
FIG. 3 is a fragmentary sectional elevational view taken along the line 3—3 of FIG. 2 showing the sheet transport and registration apparatus.

Turning now to FIG. 3, there is shown a fragmentary, sectional elevational view taken along the line 3—3 of FIG. 2 in the direction of the arrows. Idler rollers 76 define gap 100. Idler rollers 76 pass through slots 80 in tray 84. Drive roller 90 passes through slot 94 in tray 84 and is positioned in gap 100 between each of the idler rollers. Drive roller 90 is spaced from idler rollers 76. Idler rollers 76 and drive roller 94 are skewed so as to move copy sheet 102 in a forward direction and in a lateral direction. As copy sheet 102 moves in a lateral direction, the side edge 104 thereof is moved into contact with registration edge 88 of tray 84. This aligns the copy sheet. As the copy sheet passes beneath idler rollers 76 and above drive roller 90, a corrugation 106 is formed therein. Inasmuch as rollers 76 are spaced from drive roller 90, the copy sheet does not pass through a positive nip. Thus, the drive force necessary to move the copy sheet is generated by the corrugation or bend formed therein. The magnitude of the bend is dependent upon the copy sheet stiffness. As light weight copy sheets are fed through gap 100 and are bent or corrugated, inasmuch as the beam strength of the copy sheet is relatively low, the copy sheet follows the contours of the drive roller and idler roller pairs easily. This results in a low drive force. In contradistinction, when a heavy weight copy sheet is fed through gap 100, inasmuch as the beam strength of the copy sheet is relatively high, a high normal force is produced resulting in a higher driving force on the copy sheet. Spring loading of idler rollers 76 reduces the drive force on the heavy weight copy sheets and allows a larger bend or corrugation, and thus a larger drive force, for lighter weight sheets, while not too much bend or corrugation to damage the heavier weight sheets. Thus, as the copy sheet follows the contours of the rolls, it first bends, and then straightens as it is released. As the copy sheet is released, it moves in a forward direction and in a sidewise or lateral direction. Light weight and heavy weight copy sheets flex at different rates due to their differing beam strengths and thus receive the necessary force to be advanced without any adjustment. It is clear that the normal force or the drive force on each copy sheet is dependent upon the beam strength or relative thickness of the copy sheet. In this way, each copy sheet is driven with the optimum drive force. Furthermore, when the side edge of the copy sheet engages the registration edge of the tray, the copy sheet will slip rather than buckle. The force required to slip also varies as a function of the the thickness of the copy sheet inasmuch as the normal force varies as a function of the copy sheet thickness and the slip force is merely a frictional force produced by the poduct of the coefficient of friction and the normal force. Since the normal force is relatively low, the force required to induce slip of the copy sheet is less than the force required to induce buckling. Hence, as the side edge of the copy sheet engages registration edge 88, the copy sheet will slip in a lateral direction before buckling.

Figure 4:
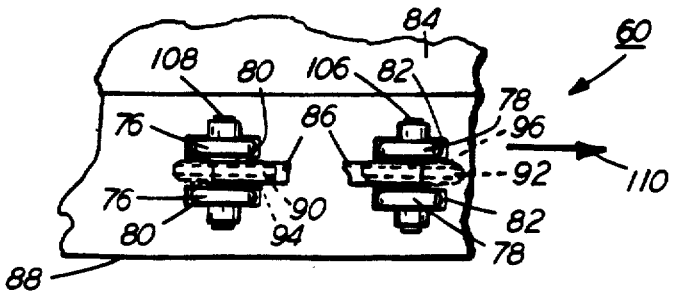
FIG. 4 is a top elevational view showing the orientation of the rollers of the FIG. 2 sheet transport and registration apparatus.

Referring now to FIG. 4, there is shown a fragmentary, plan view of sheet transporting and registering apparatus 60 of the present invention. As shown thereat, idler rollers 78 are mounted on shaft 106. The longitudinal axis of shaft 106 extends in a direction transverse to the plane defined by registration edge 88. Thus, idler rollers 78 are skewed, i.e. from an acute angle, with respect to registration edge 88. Drive roller 92 is mounted on its own drive shaft which is similarly skewed with respect to registration edge 88. Idler rollers 78 pass through slots 82 in tray 84. Similarly, drive roller 92 passes through slot 96 in tray 84, idler roller pairs 76 are mounted on shaft 108. The longitudinal axis of shaft 108 also extends in a direction substantially transverse to the plane defined by registration edge 88. In this way, idler rollers 76 are skewed, i.e. form an acute angle, with respect to registration edge 88, idler rollers 76 pass through slots 80 in tray 84. Drive roller 90 is mounted on its own drive shafts, the longitudinal axis of which also extends in a direction substantially transverse to the plane defined by registration edge 88. Thus, drive roller 90 is also skewed with respect to registration edge 88. The longitudinal axis of the shafts supporting the drive rollers and the idler rolls are substantially parallel to one another. The copy sheet is advanced along a path of travel in the direction of arrow 110. This path of travel has a forward component of movement and a lateral component of movement. As the copy sheet moves in a lateral direction the side edge thereof engages registration edge 88. When the copy sheet side engages registration edge 88, the copy sheet slips in lateral direction while continuing to move in the forward direction. This prevents buckling of the copy sheet and damage thereto.

In recapitulation, the sheet transporting and registering apparatus includes a pair of idler rollers mounted on a common shaft and spaced from one another to define a gap therebetween. A drive roller is mounted between the idler rollers with portion thereof extending into the gap. The drive roller is spaced from the idler rollers. The copy sheet is moved over the drive roller and beneath the idler rollers to form a bend or corrugation therein. Thus, as the copy sheet follow the contours of the drive roller and idler rollers it first bends and then straightens as it is released. In this way, as the copy sheet straightens, it is pushed in a forward and in a lateral direction. As the copy sheet moves in a lateral direction, the side edge thereof engages the registration edge. When the copy sheet engages the registration edge, it slips in the lateral direction while continuing to move in the forward direction. This prevents buckling of the copy sheet and damage thereto. The apparatus of the present invention provides a normal force which varies at different rates inasmuch as it is dependent upon the beam strength of the copy sheet, which, in turn, is a function of the thickness thereof. Hence, light weight copy sheets and heavy weight copy sheets deflect at different rates and thus receive the optimum force necessary to advance each in both the forward and lateral direction.

It is, therefore, evident that there has been provided, in accordance with the present invention, an apparatus for moving and aligning copy sheets. This apparatus fully satisfies the aims and advantages hereinbefore set forth. While this invention has been described in conjunction with a preferred embodiment thereof, it is evident that many alternatives, modifications, and variations will be apparent to those skilled in the art. Accordingly, it is intended to embrace all such alternatives, modifications and variations as fall within the spirit and broad scope of the appended claims.

We claim:

1. An electrophotographic printing machine of the type having a document handling apparatus for advancing individual document sheets from a stack to an exposure station and for returning the document sheets to the stack in repeated cycles, a processor for forming copies of the documents, and a copy sheet attaching station with each copy sheet being aligned during the movement thereof to the sheet attaching station, wherein the improvement includes:

a registration edge;

a pair of idler rollers spaced from one another to define a gap therebetween;

a drive roller spaced from said pair of idler rollers and having a portion thereof interposed between said pair of idler rollers in the gap with the copy sheet passing through the gap having one surface thereof contacting said pair of idler rollers and the other surface thereof contacting said drive roller so to bend the copy sheet in the gap, said drive roller and said pair of idler rollers having their respective longitudinal axes substantially parallel to one another and extending in a direction transverse to said registration edge; and means for resiliently urging said pair of idler rollers into contact with the copy sheet sheet, said drive roller and said pair of idler rollers moving the copy sheet along a path having a forward direction of movement and a lateral direction of movement substantially normal to the forward direction with the lateral movement of the copy sheet causing the side edge of the copy sheet to engage said registration edge so as to be aligned thereat, said drive roller and said pair of idler rollers applying a moving force having a magnitude proportional to the thickness of the copy sheet so that the moving force varies as a function of the thickness of the copy sheet being moved with the copy sheet slipping laterally when engaging said registration edge to prevent buckling thereof.

*2. An electrophotographic printing machine of the type in which an original document is reproduced on a copy sheet, wherein the improvement for aligning each copy sheet includes:*

*a registration edge;*

*a pair of idler rollers spaced from one another to define a gap therebetween;*

*a drive roller spaced from said pair of idler rollers and having a portion thereof interposed between said pair of idler rollers in the gap with the copy sheet passing through the gap having one surface thereof contacting said pair of idler rollers and the other surface thereof contacting said drive roller so as to bend the copy sheet in the gap, said drive roller and said pair of idler rollers having their respective longitudinal axes substantially parallel to one another and extending in a direction transverse to said registration edge; and*

*means for resiliently urging said pair of idler rollers into contact with the copy sheet, said drive roller and said pair of idler rollers moving the copy sheet along a path having a forward direction of movement and a lateral direction of movement substantially normal to the forward direction with the lateral movement of the copy sheet causing the side edge of the copy sheet to engage said registration edge so as to be aligned thereat, said drive roller and said pair of idler rollers applying a moving force having a magnitude proportional to the thickness of the copy sheet so that the moving force varies as a function of the thickness of the copy sheet being moved with the copy sheet slipping laterally when engaging said registration edge to prevent buckling thereof.*

* * * * *